(12) United States Patent
Dozier

(10) Patent No.: US 6,264,055 B1
(45) Date of Patent: Jul. 24, 2001

(54) CONTAINMENT CANISTER FOR CAPTURING HAZARDOUS WASTE DEBRIS DURING PIPING MODIFICATIONS

(75) Inventor: Stanley B. Dozier, North Augusta, SC (US)

(73) Assignee: The United States of America as represented by the United States Department of Energy, Washington, DC (US)

(*) Notice: Subject to any disclaimer, the term of this patent is extended or adjusted under 35 U.S.C. 154(b) by 0 days.

(21) Appl. No.: 09/514,375

(22) Filed: Feb. 28, 2000

(51) Int. Cl.$^7$ .................................................. B65D 25/24
(52) U.S. Cl. ..................... 220/483; 248/683; 248/689; 403/DIG. 1; 408/67; 408/76; 588/249
(58) Field of Search .................... 408/14, 67, 68, 408/76, 115 R, 115 B, 202, 241 S, 241 B, 204, 206; 220/483; 403/DIG. 1; 248/683, 689, 206.5; 588/249, 259, 900

(56) References Cited

U.S. PATENT DOCUMENTS

| | | | |
|---|---|---|---|
| 2,187,059 | * | 1/1940 | Schor et al. |
| 2,353,514 | * | 7/1944 | Slater ........................ 77/55 |
| 2,823,563 | * | 2/1958 | Nipken ...................... 77/55 |
| 3,754,141 | * | 8/1973 | Leebl et al. .............. 250/307.1 |
| 3,776,284 | * | 12/1973 | Guyer et al. .............. 141/65 |
| 3,848,687 | * | 11/1974 | Funakubo ................. 175/394 |
| 4,116,104 | * | 9/1978 | Kennedy ................... 85/3 S |
| 4,437,362 | * | 3/1984 | Hurst ......................... 81/43 |
| 4,468,321 | * | 8/1984 | St. John .................... 210/232 |
| 4,661,886 | * | 4/1987 | Nelson et al. ............. 361/399 |
| 4,782,970 | * | 11/1988 | Edwards ................... 220/1 R |
| 4,911,640 | * | 3/1990 | Schwab ..................... 433/189 |
| 4,961,674 | * | 10/1990 | Wang et al. ............... 408/14 |
| 5,031,874 | * | 7/1991 | Shannon .................... 248/683 |
| 5,087,158 | * | 2/1992 | Devine ...................... 408/67 |
| 5,121,776 | * | 6/1992 | Kovach ..................... 141/98 |
| 5,123,207 | * | 6/1992 | Gillis, Jr. et al. .......... 51/426 |
| 5,247,547 | * | 9/1993 | Doig .......................... 376/314 |
| 5,295,771 | * | 3/1994 | Wehrmann et al. ....... 408/67 |
| 5,354,154 | * | 10/1994 | Hartley ..................... 408/139 |
| 5,562,592 | * | 10/1996 | Curiel ........................ 588/259 |
| 5,562,593 | * | 10/1996 | Sammel ..................... 588/261 |
| 5,671,770 | * | 9/1997 | Rusche et al. ............. 137/318 |
| 5,685,057 | * | 11/1997 | Tsui ........................... 29/516 |
| 5,799,849 | * | 9/1998 | Beer et al. ................. 224/403 |
| 5,807,019 | * | 9/1998 | Meyer ........................ 403/410 |
| 5,860,711 | * | 1/1999 | Kronberg et al. ......... 312/1 |
| 5,895,189 | * | 4/1999 | Ruckert ..................... 411/535 |
| 5,898,987 | * | 5/1999 | Onofrio ..................... 29/446 |
| 6,092,292 | * | 7/2000 | Molnar et al. ............. 30/410 |
| 6,196,274 | * | 3/2001 | Duncan ..................... 141/1 |

FOREIGN PATENT DOCUMENTS

| 302029 | * | 2/1989 | (EP) . |
|---|---|---|---|
| 2103989 | * | 3/1983 | (GB) . |
| 2213861 | * | 8/1989 | (GB) . |

* cited by examiner

*Primary Examiner*—A. L. Wellington
*Assistant Examiner*—Monica Carter
(74) *Attorney, Agent, or Firm*—James C. Durkis; Virginia B. Caress; Paul A. Gottlieb

(57) ABSTRACT

The present invention relates to a capture and containment canister which reduces the risk of radiation and other biohazard exposure to workers, the need for a costly containment hut and the need for the extra manpower associated with the hut. The present invention includes the design of a canister having a specially designed magnetic ring that attracts and holds the top of the canister in place during modifications to gloveboxes and other types of radiological and biochemical hoods. The present invention also provides an improved hole saw that eliminates the need for a pilot bit.

5 Claims, 6 Drawing Sheets

CONTAINMENT CANISTER FOR CAPTURING HAZARDOUS WASTE DEBRIS DURING PIPING MODIFICATIONS

BACKGROUND OF THE INVENTION

1. FIELD OF THE INVENTION

The present invention relates to a containment canister for capturing hazardous waste debris during modifications to gloveboxes, or other radiological or biochemical hoods (generally termed gloveboxes therein), that require drilling and welding operations. Examples of such modifications include penetrations for pipe, thermowells, etc. In particular, the present invention relates to an improved containment canister that eliminates the need for costly containment huts and additional man power while at the same time reducing the risk of radiation exposure or other biohazard exposure to workers during glovebox modifications. The present invention also provides an improved hole saw which enables a driller to remove metal shavings and replace the hole saw if there is tooth wear present on the hole saw prior to actually penetrating a glovebox during modifications.

2. THE PRIOR ART

The prior art requires the erection of a containment hut for performing glovebox modifications, such as making penetrations for piping and thermowells. Such a procedure of capturing hazardous debris during drilling in a glovebox operation requires several health protection and support personnel to provide coverage for the person performing the work as well as maintaining and cleaning up the work area. This is a very expensive and time consuming technique. Further, a dropped tool in a glove box—containment hut environment can be dangerous, as attempts to retrieve the dropped tool can result in punctures or tears in protective garments, thus exposing the worker to contamination. Additionally, unretrieved tools and uncontained metal shavings can puncture glovebox gloves used by operators who may not be aware of the hazards after the modifications have been completed.

Accordingly, it would be desirable to provide for a safer, less costly approach that eliminates the need for a containment hut and the extra manpower associated therewith.

U.S. Pat. No. 5,295,771 to Wehrmann et al. relates to a clean room tool chamber having a portable glovebox.

U.S. Pat. No. 5,087,158 to Devine relates to a drilling jig for holding drilling debris. The cylinder of this reference has a lid which is adhesively sealed to the cylinder.

Additionally, it would be desirable to have a containment canister which does not require a containment hut, can contain the metal shavings and drilling fragments during drilling and welding operations in glovebox modification procedures and in a radioactive or other biohazard environment, that reduces the risk of contamination, and be less costly and require less manpower than the prior art approaches.

SUMMARY OF THE INVENTION

It is therefore a principal object of the invention to provide a improved containment canister which reduces the radiation and other biohazard exposure to workers, as well as eliminating the need for a containment hut and the number of personnel associated with such an approach.

It is further an object of the invention to provide magnetic means for securing and holding the top of the canister to the glovebox so that the canister is securely fitted in place during glovebox modifications such as drilling and welding operations.

It is yet another object to provide an improved hole saw which eliminates the need to replace the pilot bit which frequently breaks off after penetrating the glovebox surface, thus reducing the risk of spreading contamination outside of the glovebox to workers.

It is still another object to provide the canister with an adjustable shutter on the side of the canister to control the airflow through the canister.

It is yet another object to provide the canister with a heat resistant gasket for use on top of the canister, thus providing an air seal.

These objects are realized in part by providing a canister having an open top with magnetically attractive means that is held firmly in place inside the glovebox by an electromagnet or lode (mill) magnets mounted outside the glovebox during modifications that require drilling and welding operations. These objects are also realized in part by providing an improved hole saw and toggle bolt assembly.

Other objects will become apparent from the foregoing description and accompanying drawings as set forth below.

DETAILED DESCRIPTION OF THE PREFERRED EMBODIMENTS

Figure 1:
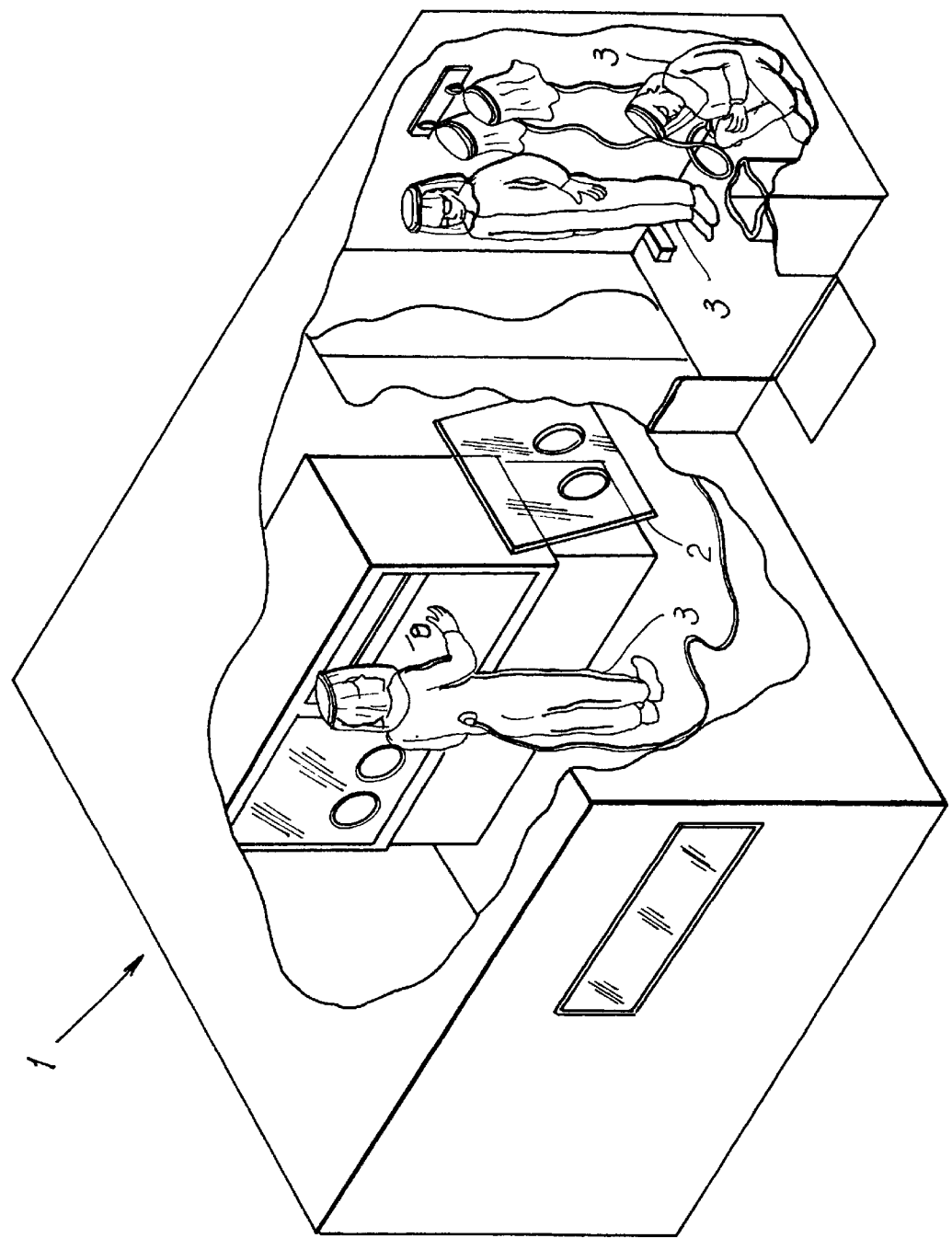
FIG. 1 is a partially sectioned perspective view of the prior art.

Referring to FIGS. 1–6 of the drawings and in particular FIG. 1 which illustrates the prior art procedure utilizing a containment hut 1 and pulling a panel 2 for the glovebox. Workers in air supplied plastic suits 3 require constant assistance and monitoring by health protection and support personnel.

Before any drilling or welding can occur for modifications to a glovebox of the prior art of FIG. 1, the panel 2 of the glovebox must be removed. After the construction of the containment hut 1 is completed and the panel 2 is removed, the worker inserts his arm and possibly other parts of his body into the glovebox in order to contain metal shavings and to assist during glovebox modifications. This work procedure exposes the worker to an increased risk of radiological or other biohazard contamination which requires additional manpower consisting of health protection and other support personnel to monitor safety conditions and to remove and dispose of the waste generated. It is a very expensive and time consuming procedure with a great possibility for the spread of contamination.

Figure 2:
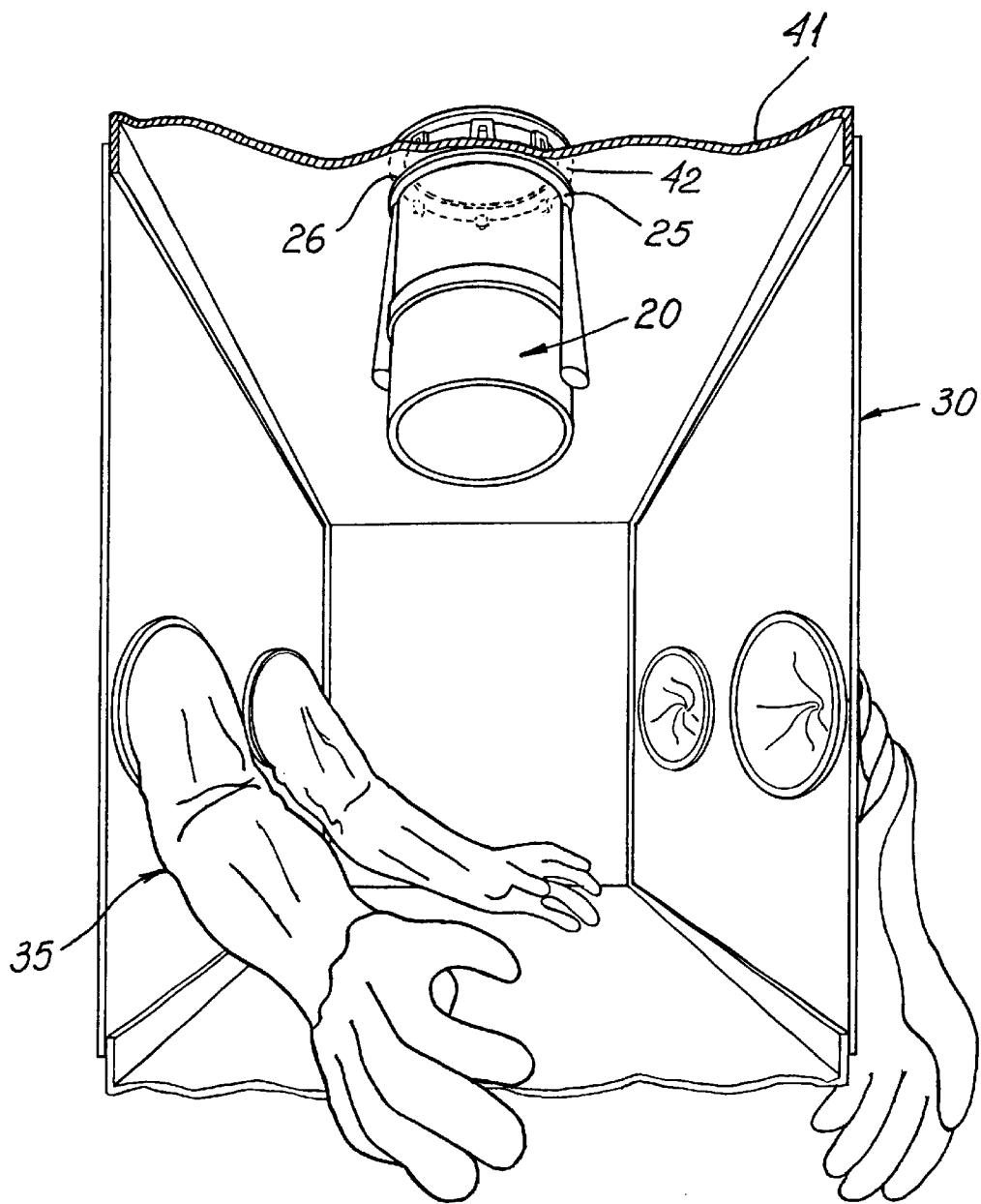
FIG. 2 is a perspective view of the present invention.

FIG. 2 illustrates the present invention that includes a canister 20 which is fitted with an adjustable clamp 25. The clamp 25 is topped with a lip 26 that allows it to be magnetically attracted. The canister 20 is located in a glovebox 30.

Figure 3:
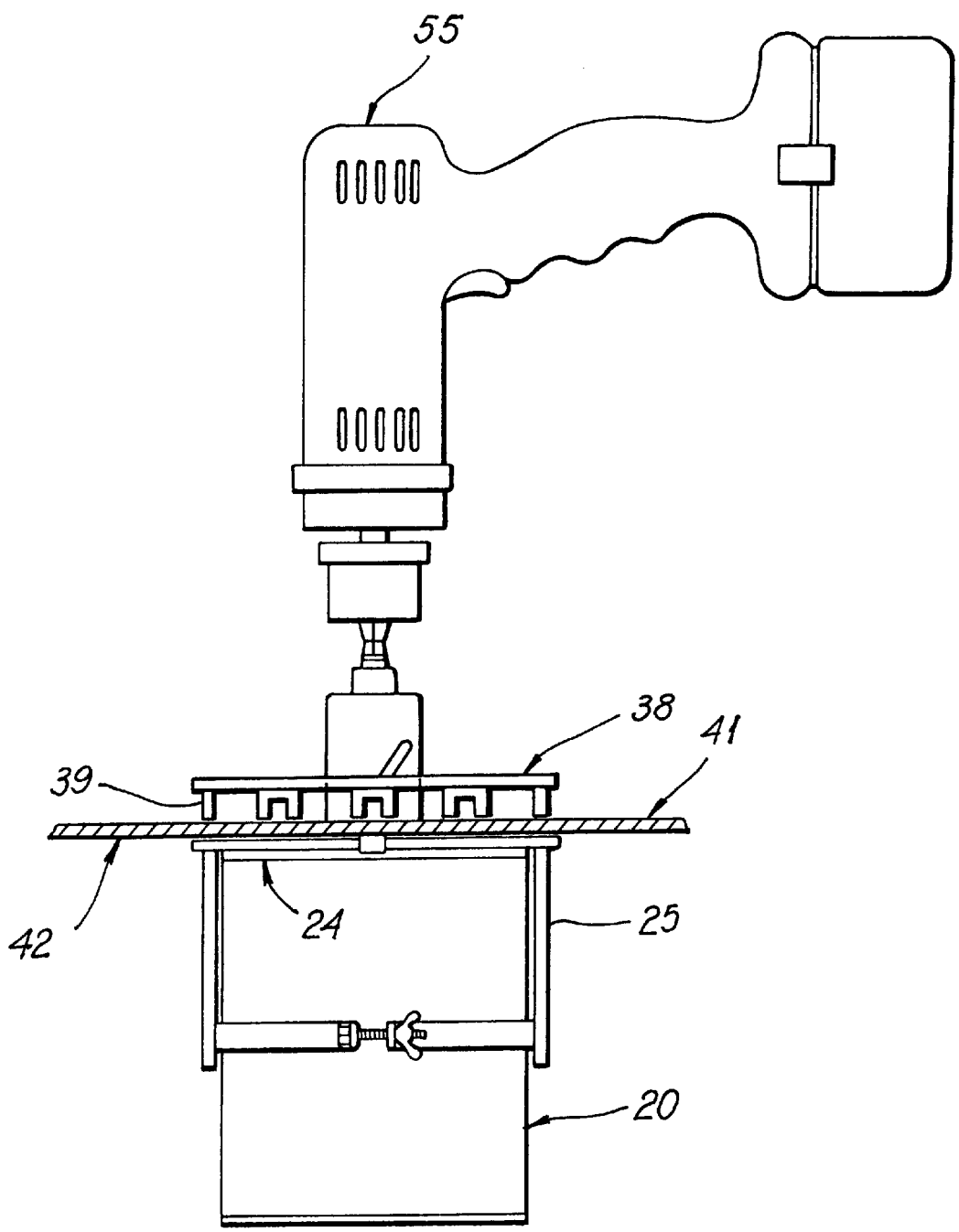
FIG. 3 is a partially sectioned perspective view of a first embodiment of the invention.

FIG. 3 is a first embodiment illustrating one magnetic means for securing the canister 20 in place to the interior surface 42 of the top 41 of the glovebox 30 during modifications. It is held in place by a ring 38 having magnets 39 thereon, positioned outside the cabinet and centered over the point of modification. The magnets 39 are preferably lode (mill) magnets and preferably have a 35-pound strength for each magnet. The number of magnets 39 may vary based on the magnet strength, the size of the canister and the weight of the materials to be contained. It is understood that the invention is not limited to lode (mill) magnets or any particular type of magnetic means.

With this invention workers can use the existing glovebox arms gloves 35 to place the canister in position and perform their work without breaching the panel. The canister 20 with the clamp 25 attached is inserted into the glovebox 30 through a bag out port (not shown). The magnetic ring 38 is placed on top 41 of the cabinet 30 to be modified. The strong magnetic force between the ring and the lip of the clamp attracts to form an alignment and firmly holds the parts together during glovebox modification including but not limited to drilling and welding.

Figure 3A:
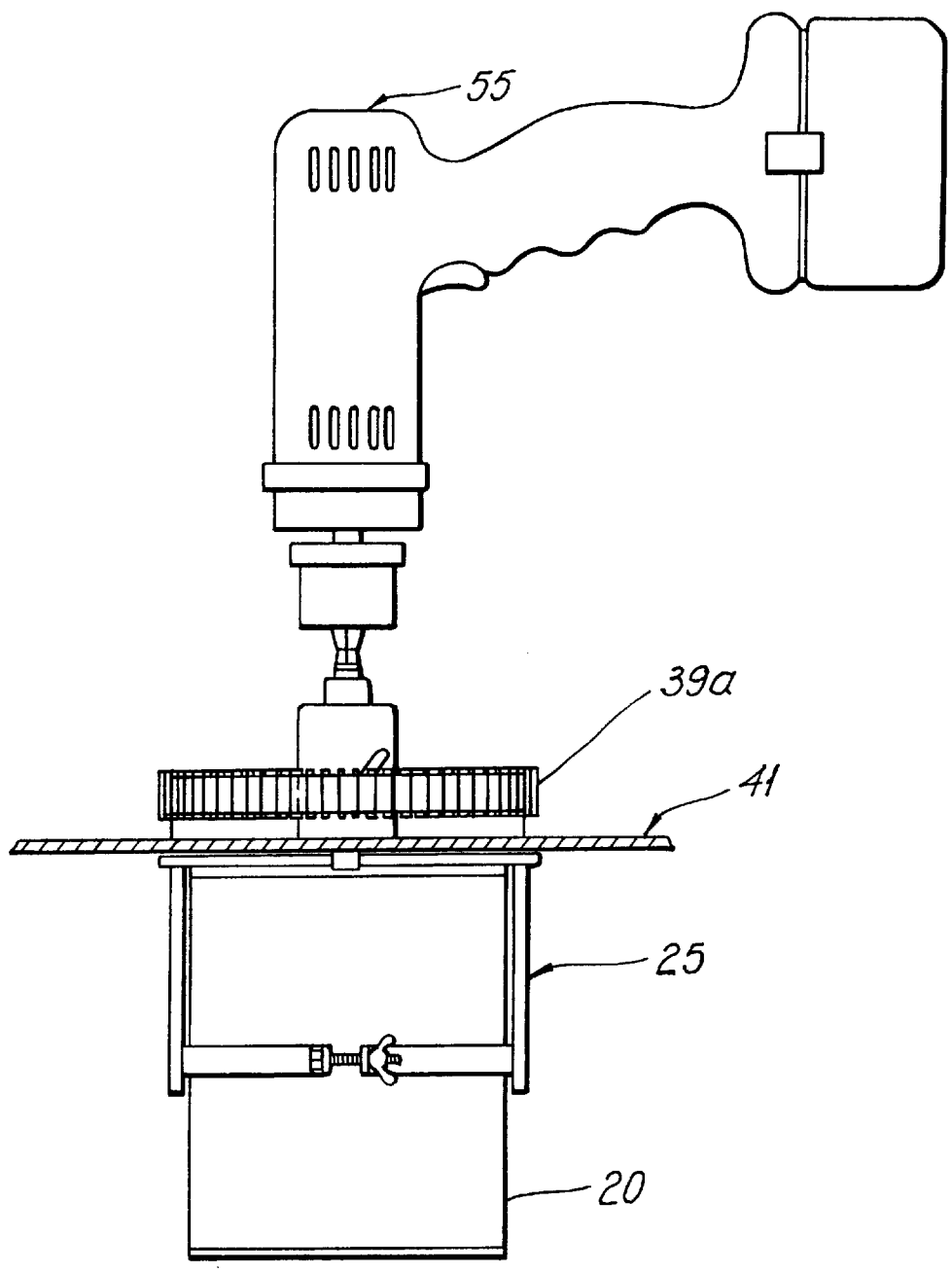
FIG. 3A is a partially sectioned perspective view of a second embodiment of the invention.

FIG. 3A shows a second embodiment in which an electromagnet 39a is used instead of the lode (mill) magnets 39 of FIG. 3.

Figure 4:
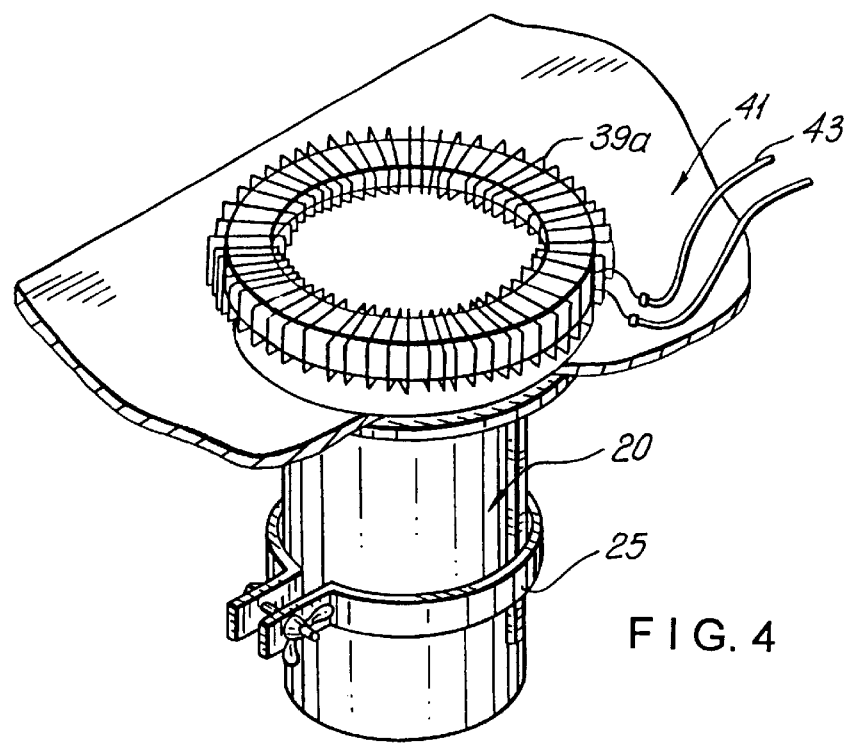
FIG. 4 is a partially sectioned perspective view of the second embodiment shown in FIG. 3A of the invention.

FIG. 4 illustrates the electromagnet 39a fixedly in place above the canister 20.

Figure 5:
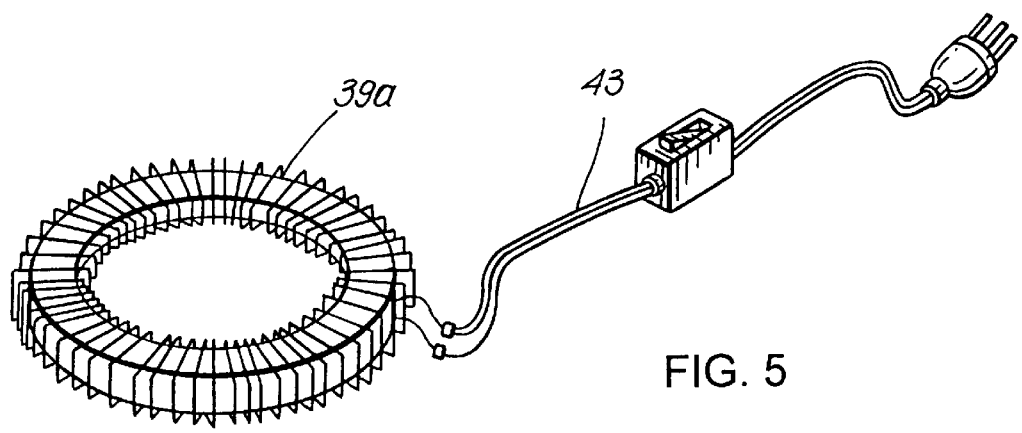
FIG. 5 is a perspective view of the electromagnet of the second embodiment shown in FIG. 3A of the invention.

FIG. 5 shows the electromagnet 39a and the cord 43 for plugging the electromagnet 39a into an electrical outlet to power the electromagnet 39a. Electromagnets can produce various levels of heat based on the strength trying to be achieved and can effect equipment and instruments that rely on radio frequencies. Accordingly, the electromagnet can be produced with insulation and even a water-cooled jacket in order compensate for the produced heat. Further, when planning to use the containment canister of the present invention with an electromagnet, special considerations should be given to surrounding equipment or instrumentation that may be affected by heat and/or radio frequencies produced by the electromagnet. Accordingly a user may wish to bypass or shut down surrounding equipment that might be affected by radio waves and to protect surrounding equipment with insulation from the heat produced by the electromagnet.

Figure 6:
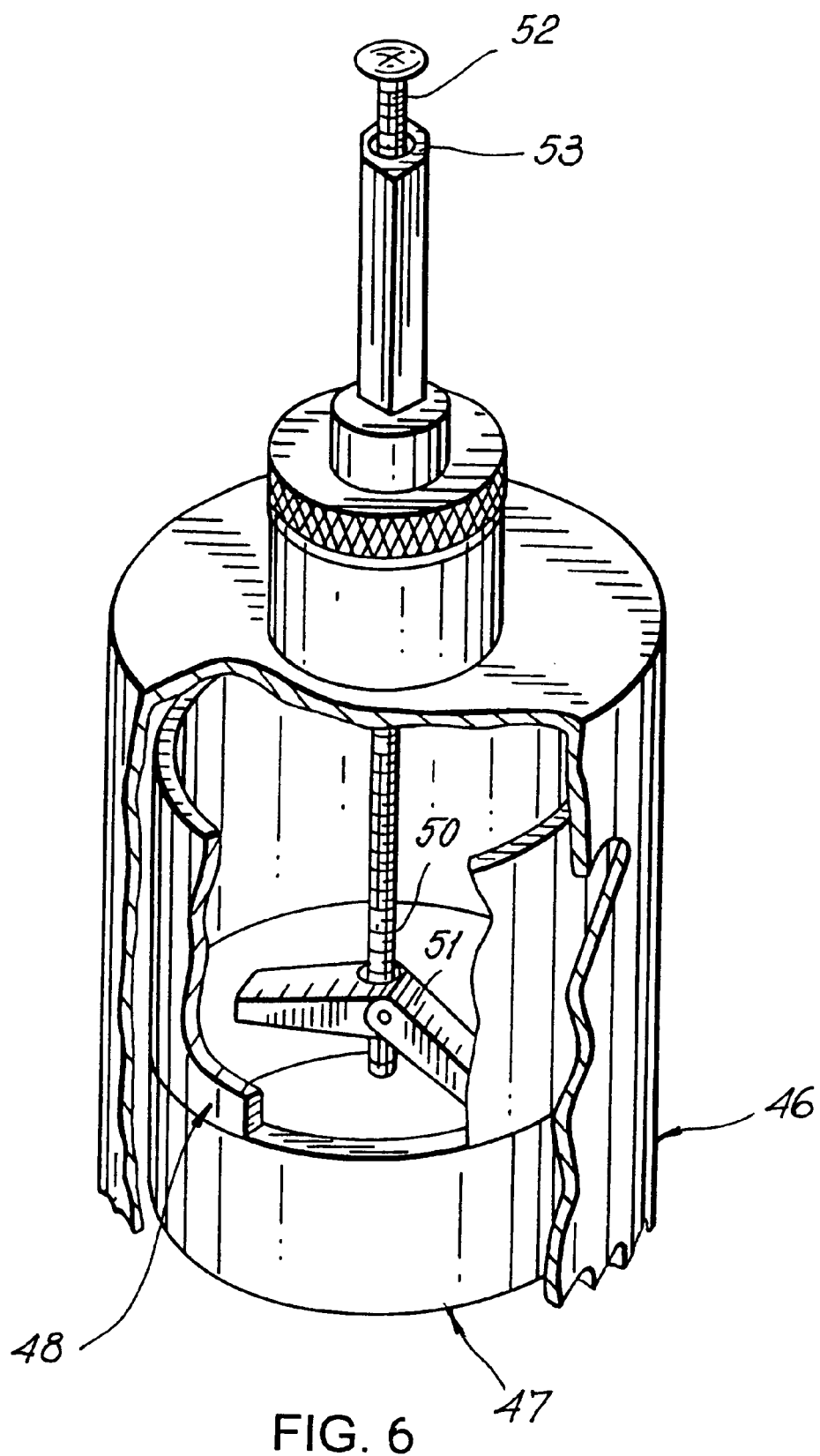
FIG. 6 is a partially sectioned perspective view of the hole saw assembly.

FIG. 6 illustrates a preferred embodiment of the improved hole saw 46 of the invention. As seen in FIGS. 3 and 3A, the operator drills with a drill 55 through the top of the cabinet 41. The improved hole saw 46 of the present invention provides the operator with better control over the actual cutting time and eliminates the need for frequent bit replacements. Controlling the cutting time enables the worker to remove excess metal shavings and to replace the hole saw if tooth wear dictates. The conventional drilling technique typically requires replacement of the pilot bit. The pilot bit serves as a guide; thus it is the first part of the drill to penetrate the drilling surface. The pilot bit frequently breaks after penetrating the surface. Regardless of safety precautions taken by the workers, the replacement of the bit always spreads contamination outside of the glovebox.

As shown in FIG. 6 the present invention replaces the pilot bit with a first piece of pipe 47 having a slightly smaller diameter than the inside diameter of the hole saw 46. This first pipe 47 is tac welded to the top of the glovebox 30. A second length of pipe 48 can be used in combination with the first piece of welded pipe 47. Using this technique, the combination of the two lengths must have an overall length that is slightly less than the length of the hole saw 46. The second piece of pipe 48 is placed into the well of the hole saw 46 during drilling, causing the hole saw 46 to bottom out before the hole saw 46 completely penetrates the glovebox top 41. This provides the worker with an opportunity to remove the excess metal shavings and replace the hole saw 46, if necessary.

The present invention further includes a toggle bolt assembly 50 (FIG. 6) which prevents the cut out portion of the glovebox top 41 from dropping forcefully into the containment canister 20 and possibly spreading contamination. A toggle nut 51 is welded inside the first piece of pipe 47 when the first piece of pipe 47 is initially welded to the glovebox 30. Before the attachment of the hole saw 46 to the drill motor 55, the toggle bolt 52 is passed through the hole saw arbor 53 and threaded into the toggle nut 51. The combination of the toggle bolt assembly 50 and the first piece of pipe 47 allowed the cut out portion of the glovebox top 41 to remain with the hole saw 46 until the worker detached it. Once the cut out section and all other debris is inserted into the canister 20, the canister is removed from its magnetically attracted position in the glovebox through the gloveports. The clamp is then loosened and lowered. A canister lid (not shown) is then securely placed on top of the canister 20, and the canister 20 is passed out of the glovebox 30 through the bag out port (not shown) and disposed of according to operational procedures.

An added benefit from the present invention is that the capture and containment canister 20 provides a buffer from the tremendous airflow into the glovebox 30 which assists in the use of a helical welding rig.

The present invention can also be modified to include an adjustable shutter on the side of the canister 20 (not shown) to control the airflow through the canister 20 and into the glovebox once a penetration has been made. This ensures airflow from outside the cabinet to inside the cabinet, which is an essential part of the glovebox technique. Also a heat resistant gasket can be added for use on top of the canister 20 (not shown).

The present invention can also be modified for use on the side of a glovebox by mitering the canister to an angle such as 45 degrees (more or less) and attaching the magnetic ring 38 to the side wall of the glovebox using a method such as tac welding nuts to the outer wall and bolting the ring in place.

This invention is not limited to any particular details or constructions set forth in this specification or drawings as these details may be modified without departing from the spirit or the scope of the claimed invention.

Having thus described the invention, what is claimed as new and desired to be secured by letters patent is as follow:

1. A containment device for capturing hazardous waste debris during glovebox modifications, comprising:
   a canister, positioned inside a glovebox, having an opening at the top of said canister for capturing debris, and having a lid for sealing said canister,
   an adjustable clamp positioned on the inside surface of said glovebox for holding said canister inside said glovebox, said clamp having a top surface having a carbon steel lip, and
   a magnetic ring, positioned outside said glovebox for magnetically attracting and holding said adjustable clamp with said canister in a desired position inside said glovebox.

2. The canister according to claim 1 further comprising said magnetic ring is formed of ring having a plurality of attached magnets.

3. The canister according to claim 2 further comprising each of said plurality of attached magnets is a 35 pound strength magnet.

4. The canister according to claim 3 further comprising each of said 35 pound strength magnets is a lode (mill) magnet.

5. The canister according to claim 1 further comprising said magnetic ring is an electromagnet.

* * * * *